(12) United States Patent
Uhlich

(10) Patent No.: US 6,993,412 B2
(45) Date of Patent: Jan. 31, 2006

(54) METHOD FOR CONTROLLING AN INDUSTRIAL PROCESSING MACHINE

(75) Inventor: Andreas Uhlich, Wendelstein (DE)

(73) Assignee: Siemens Aktiengesellschaft, München (DE)

( * ) Notice: Subject to any disclaimer, the term of this patent is extended or adjusted under 35 U.S.C. 154(b) by 113 days.

(21) Appl. No.: 10/454,369

(22) Filed: Jun. 4, 2003

(65) Prior Publication Data

US 2004/0024487 A1 Feb. 5, 2004

(30) Foreign Application Priority Data

Jun. 4, 2002 (DE) ................................ 102 24 755

(51) Int. Cl.
*G06F 19/00* (2006.01)
(52) U.S. Cl. ........................ 700/189; 700/187; 700/252
(58) Field of Classification Search .................. 700/56, 700/61, 186, 187, 189, 193, 194, 252
See application file for complete search history.

(56) References Cited

U.S. PATENT DOCUMENTS

| | | | | |
|---|---|---|---|---|
| 4,541,060 A | * | 9/1985 | Kogawa ...................... | 700/252 |
| 5,369,592 A | * | 11/1994 | Honda ......................... | 700/187 |
| 5,418,731 A | | 5/1995 | Yoshimura et al. .......... | 700/189 |
| 5,465,474 A | * | 11/1995 | Kimura et al. ............... | 29/6.01 |
| 5,726,896 A | | 3/1998 | Jia et al. ..................... | 700/187 |
| 6,311,098 B1 | * | 10/2001 | Higasayama et al. ....... | 700/159 |
| 6,782,306 B2 | * | 8/2004 | Yutkowitz ................... | 700/189 |

FOREIGN PATENT DOCUMENTS

| | | |
|---|---|---|
| DE | 40 22 799 A1 | 1/1992 |
| EP | 0 268 491 A2 | 5/1988 |
| EP | 0 420 244 B1 | 3/1994 |
| EP | 0 390 678 B1 | 12/1994 |
| EP | 0 335 984 B1 | 7/1995 |

OTHER PUBLICATIONS

"Aus eins mach zwei", in: "Maschine und Werkzeug", Mar. 2001.
Yeung et al.: Curve fitting with arc splines for NC toolpath generation, in: Computer-Aided Design, vol. 26, Nov. 11, 1994.
Hutzler: "Versatile control for Highly Complex Machine Tools", in: Engineering & Automation, vol. 13, Nov./Dec. 1991.
Austin et al.: Comparison of discretization algorithms for NURBS surfaces with application to numerically controlled machining, in: Computer-Aided Design, Jan. 19, 1996.

* cited by examiner

*Primary Examiner*—Paul Rodriguez
(74) *Attorney, Agent, or Firm*—Henry M. Feiereisen

(57) ABSTRACT

A method and system for describing a three-dimensional path of an industrial processing machine, such as a machine tool, a robot and the like, is disclosed. According to the disclosed method and system, the path is described by a curve that includes at least one interpolation, wherein at least one interpolation parameter is a function of an angle along the three-dimensional path.

15 Claims, 7 Drawing Sheets

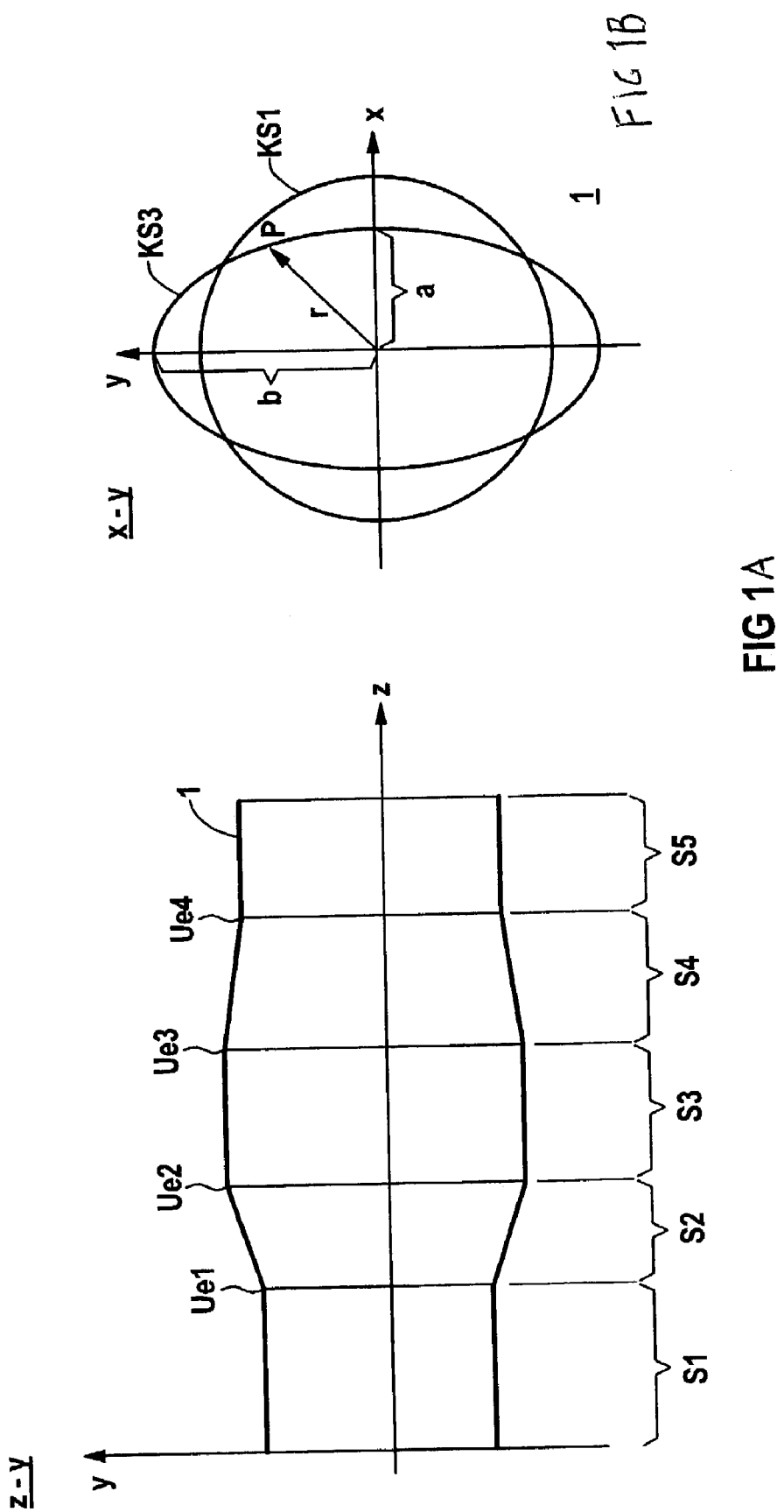

C96.0909 X.1000000
C96.5455 X1.000000
C97.0000 X1.000000
C97.3174 X0.994001
C97.6347 X0.975850
C97.9475 X0.945807
C98.2603 X0.903268
C98.5633 X0.849506
C98.8663 X0.782004
FIG 3  PRIOR ART
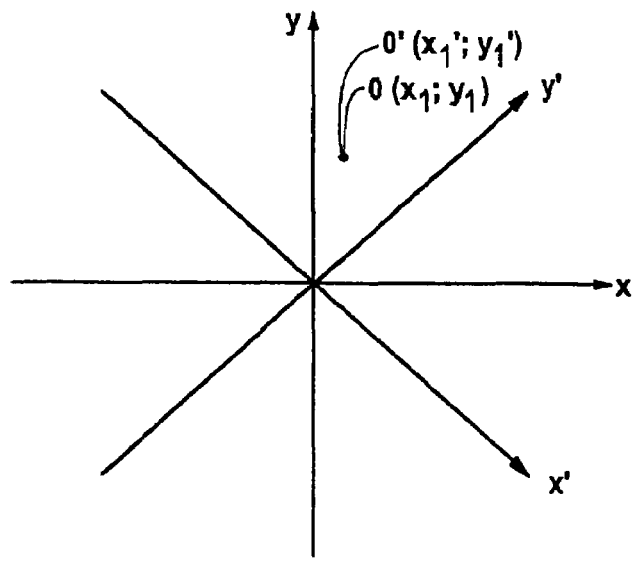
FIG 4
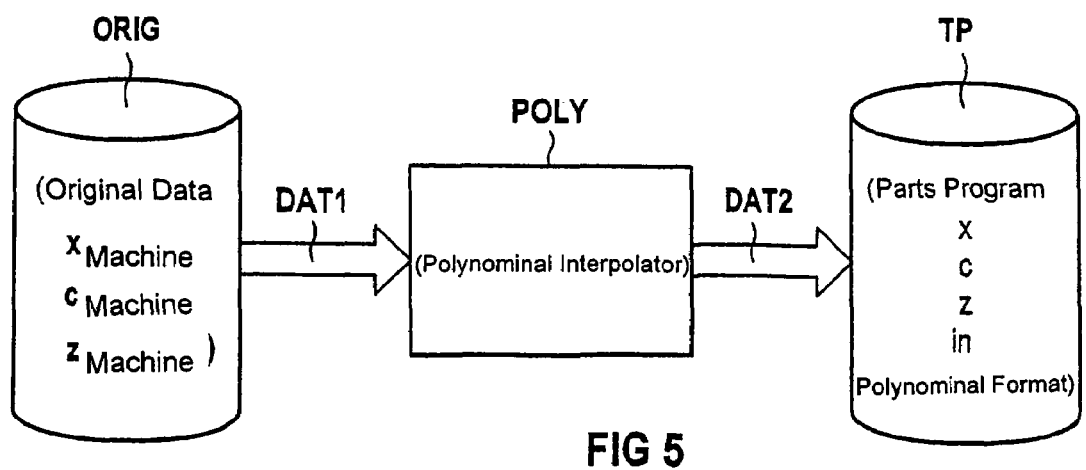
FIG 5

L2  Z1 — CO X24.9750000 Z0
    — G90
Z2 — POLY
Z3 — C=DC(45.0000000) PO[X]=(-25.000000,0,0.0033494) PO[Z]=(0.1250000,0,0)
⋮    C=DC(90.0000000) PO[X]=(-24.975000,0.0100481,-0.0167468) PO[Z]=(0.2500000,0,0)
     C=DC(135.0000000) PO[X]=(-25.000000,-0.0401924,0.0136379) PO[Z]=(0.3750000,0,0)
     C=DC(180.0000000) PO[X]=(-25.025000,0.0007214,0.0121951) PO[Z]=(0.5000000,0,0)
     C=DC(225.0000000) PO[X]=(-25.000000,0.0373067,-0.0124183) PO[Z]=(0.6250000,0,0)
     C=DC(270.0000000) PO[X]=(-24.975000,0.0000518,-0.0125219) PO[Z]=(0.7500000,0,0)
     C=DC(315.0000000) PO[X]=(-25.000000,-0.0375139,0.0125059) PO[Z]=(0.8750000,0,0)
     C=DC(0) PO[X]=(-25.025000,0.0000037,0.0124984) PO[Z]=(1.0000000,0,0)
     C=DC(45.0000000) PO[X]=(-25.000000,0.0374990,-0.0124996) PO[Z]=(1.1250000,0,0)
     C=DC(90.0000000) PO[X]=(-24.975000,0.0000003,-0.0125001) PO[Z]=(1.2500000,0,0)
     C=DC(135.0000000) PO[X]=(-25.000000,-0.0375001,0.0125000) PO[Z]=(1.3750000,0,0)
     C=DC(180.0000000) PO[X]=(-25.025000,0,0.0125000) PO[Z]=(1.5000000,0,0)
     C=DC(225.0000000) PO[X]=(-25.000000,0.0375000,-0.0125000) PO[Z]=(1.6250000,0,0)
     C=DC(270.0000000) PO[X]=(-24.975000,0,-0.0125000) PO[Z]=(1.7500000,0,0)
     C=DC(315.0000000) PO[X]=(-25.000000,-0.0375000,0.0125000) PO[Z]=(1.8750000,0,0)
     C=DC(0) PO[X]=(-25.025000,0,0.0125000) PO[Z]=(2.0000000,0,0)
     C=DC(45.0000000) PO[X]=(-25.000000,0.0375000,-0.0125000) PO[Z]=(2.1250000,0,0)
     C=DC(90.0000000) PO[X]=(-24.975000,0,-0.0125000) PO[Z]=(2.2500000,0,0)
     C=DC(135.0000000) PO[X]=(-25.000000,-0.0375000,0.0125000) PO[Z]=(2.3750000,0,0)
     C=DC(180.0000000) PO[X]=(-25.025000,0,0.0125000) PO[Z]=(2.5000000,0,0)
     C=DC(225.0000000) PO[X]=(-25.000000,0.0375000,-0.0125000) PO[Z]=(2.6250000,0,0)
     C=DC(270.0000000) PO[X]=(-24.975000,0,-0.0125000) PO[Z]=(2.7500000,0,0)
     C=DC(315.0000000) PO[X]=(-25.000000,-0.0375000,0.0125000) PO[Z]=(2.8750000,0,0)
     C=DC(0) PO[X]=(-25.025000,0,0.0125000) PO[Z]=(3.0000000,0,0)
     C=DC(45.0000000) PO[X]=(-25.000000,0.0375000,-0.0125000) PO[Z]=(3.1250000,0,0)
     C=DC(90.0000000) PO[X]=(-24.975000,0,-0.0125000) PO[Z]=(3.2500000,0,0)
     C=DC(135.0000000) PO[X]=(-25.000000,-0.0375000,0.0125000) PO[Z]=(3.3750000,0,0)
     C=DC(180.0000000) PO[X]=(-25.025000,0,0.0125000) PO[Z]=(3.5000000,0,0)
     C=DC(225.0000000) PO[X]=(-25.000000,0.0375000,-0.0125000) PO[Z]=(3.6250000,0,0)
     C=DC(270.0000000) PO[X]=(-24.975000,0,-0.0125000) PO[Z]=(3.7500000,0,0)
     C=DC(315.0000000) PO[X]=(-25.000000,-0.0375000,0.0125000) PO[Z]=(3.8750000,0,0)
     C=DC(0) PO[X]=(-25.025000,0,0.0125000) PO[Z]=(4.0000000,0,0)
     C=DC(45.0000000) PO[X]=(-25.000000,0.0375000,-0.0125000) PO[Z]=(4.1250000,0,0)
     C=DC(90.0000000) PO[X]=(-24.975000,0,-0.0125000) PO[Z]=(4.2500000,0,0)
     C=DC(135.0000000) PO[X]=(-25.000000,-0.0375000,0.0125000) PO[Z]=(4.3750000,0,0)
     C=DC(180.0000000) PO[X]=(-25.025000,0,0.0125000) PO[Z]=(4.5000000,0,0)
     C=DC(225.0000000) PO[X]=(-25.000000,0.0375000,-0.0125000) PO[Z]=(4.6250000,0,0)
     C=DC(270.0000000) PO[X]=(-24.975000,0,-0.0125000) PO[Z]=(4.7500000,0,0)
     C=DC(315.0000000) PO[X]=(-25.000000,-0.0375000,0.0125000) PO[Z]=(4.8750000,0,0)
     C=DC(0) PO[X]=(-25.025000,0,0.0125000) PO[Z]=(5.0000000,0,0)
     C=DC(45.0000000) PO[X]=(-25.000000,0.0375000,-0.0125000) PO[Z]=(5.1250000,0,0)
     C=DC(90.0000000) PO[X]=(-24.975000,0,-0.0125000) PO[Z]=(5.2500000,0,0)
     C=DC(135.0000000) PO[X]=(-25.000000,-0.0375000,0.0125000) PO[Z]=(5.3750000,0,0)
     C=DC(180.0000000) PO[X]=(-25.025000,0,0.0125000) PO[Z]=(5.5000000,0,0)
     C=DC(225.0000000) PO[X]=(-25.000000,0.0375000,-0.0125000) PO[Z]=(5.6250000,0,0)
     C=DC(270.0000000) PO[X]=(-24.975000,0,-0.0125000) PO[Z]=(5.7500000,0,0)
     C=DC(315.0000000) PO[X]=(-25.000000,-0.0375000,0.0125000) PO[Z]=(5.8750000,0,0)
     C=DC(0) PO[X]=(-25.025000,0,0.0125000) PO[Z]=(6.0000000,0,0)
     C=DC(45.0000000) PO[X]=(-25.000000,0.0375000,-0.0125000) PO[Z]=(6.1250000,0,0)
     C=DC(90.0000000) PO[X]=(-24.975000,0,-0.0125000) PO[Z]=(6.2500000,0,0)
     C=DC(135.0000000) PO[X]=(-25.000000,-0.0375000,0.0125000) PO[Z]=(6.3750000,0,0)
     C=DC(180.0000000) PO[X]=(-25.025000,0,0.0125000) PO[Z]=(6.5000000,0,0)
     C=DC(225.0000000) PO[X]=(-25.000000,0.0375000,-0.0125000) PO[Z]=(6.6250000,0,0)
     C=DC(270.0000000) PO[X]=(-24.975000,0,-0.0125000) PO[Z]=(6.7500000,0,0)

FIG 7

| WT | Radial Drop (mm) | | |
|---|---|---|---|
| c. | Min | Nom | Max |
| 0.0 | 0.0000 | 0.0000 | 0.0000 |
| 10.0 | 0.0111 | 0.0114 | 0.0117 |
| 20.0 | 0.0471 | 0.0485 | 0.0499 |
| 30.0 | 0.1110 | 0.1143 | 0.1176 |
| 40.0 | 0.1905 | 0.1965 | 0.2025 |
| 50.0 | 0.2655 | 0.2745 | 0.2835 |
| 60.0 | 0.3288 | 0.3408 | 0.3528 |
| 70.0 | 0.3773 | 0.3913 | 0.4053 |
| 80.0 | 0.4096 | 0.4246 | 0.4396 |
| 90.0 | 0.4210 | 0.4160 | 0.4510 |

METHOD FOR CONTROLLING AN INDUSTRIAL PROCESSING MACHINE

CROSS-REFERENCES TO RELATED APPLICATIONS

This application claims the priority of German Patent application, Ser. No. 102 24 755.2, filed Jun. 4, 2002, pursuant to 35 U.S.C. 119(a)–(d), the disclosure of which is incorporated herein by reference.

BACKGROUND OF THE INVENTION

The invention relates to a method for describing the three-dimensional path of an industrial processing machine, such as a machine tool, a robot and the like.

Published European patent specification EP 04 17 337 A1 describes a method for controlling a numerically controlled machine or a robot using a spline interpolation. The axes parameters (x, y) are hereby defined as functions of a path parameter (s). The velocity along the path is controlled by expanding the paths of the functions or by sampling the paths with different step lengths. Alternatively, the support points for the spines can be varied as a function of the path parameters to reflect a desired velocity profile.

Disadvantageously, when using a spline interpolation, only two axes parameters can be selected for a two-dimensional representation in a fixed Cartesian coordinate system. This restricts the use of spline interpolations for controlling the path of numerically controlled machines or robots. One example for a conventional application of spline interpolations can be found in the user reference and programming manual "SINUMERIK System 800", revision 09.88, by Siemens AG (Order No. 6ZB5 410-7BA01-0BA0).

One example of a numerically controlled machine is a machine tool, in particular a turning machine or a lathe. The turning machine has at least a rotation function. For turning applications, eccentric contours are of particular interest. An eccentric contour, which can also be divided into different sectors, is characterized by a radial distance r which is a dependent variable and geometrically controlled by one or two independent variables z and c. The value z is here the position on a z-axis, whereas the value c represents an angular position. The result is a function f for the radial distance r with r=f(z, c). Different discrete tables are defined for r=f(c) for a number of sectors and stored in a numerical controller and recalled for defined positions on the z-axis. In other words, at certain positions on the z-axis, a switchover to the tables occurs. The tables are quite large and require a large memory space. Moreover, this method for motion control is not capable of completely and continuously describing a freeform surface for turning, because the tables are constructed two-dimensionally and can only be changed in a discrete fashion.

It would therefore be desirable and advantageous to provide an improved device for a three-dimensional path description of an industrial processing machine, which obviates prior art shortcomings and obviates the need for storing and manipulating tables with large datasets.

SUMMARY OF THE INVENTION

According to one aspect of the invention, a method for controlling an industrial processing machine, such as a machine tool, a robot and the like, includes the steps of defining at least one three-dimensional path, performing at least one interpolation along the three-dimensional path, and guiding a movement of at least one of a workpiece and a tool along the three-dimensional path. A parameter of the at least one interpolation is a function of an angle of the three-dimensional path.

The path description can be used with different applications. For example, the path can describe a freeform surface and/or an eccentric contour. Or the path description can be used to have a processing tool generate a freeform surface of a three-dimensional body. The body itself can also be moved, so that the path of the tool can be different from the freeform surface and/or the contours of the body. Turning machines are one example where the body can also be moved. The method of the invention can advantageously also be used with milling and/or grinding machines having rotation axes. Robots as well as turning machines can have multiple axes. Spline interpolations can be performed, for example, on Cartesian coordinate axes. Advantageously, rotation axes can be interpolated by using an angular value as a rotation parameter. This approach advantageously increases the accuracy by which the path can be controlled, as well as the precision of the surface finish and/or the surface generation. This approach also enhances the control system for motion control by allowing more rapid control and requiring less memory. The rotation axis/axes with the rotation parameter(s) can be implemented either as real axes having functionality or as virtual axes to be used for transformations between coordinate systems.

The interpolation method may include using polynomial functions. At least one rotation parameter can be used as an interpolation parameter. One particular rotation parameter representing the interpolation parameter can be a rotation angle, denoted by the letter c. The rotation parameter can depend on at least one other parameter, so that the rotation parameter is a function of at least one variable.

Moreover, interpolations to be used in a control method can employ at least one spline. A spline interpolation method uses a limited number of support points on a desired contour that can be connected by smooth curves. For example, individual curve segments can be joined, so that the slope and the curvature are identical at the connecting points. This approach produces soft transitions which not only protects the mechanical components of machine tools, but also enhances the machining quality, for example, milling, turning, grinding, welding and painting. The support points can be placed in close proximity to program sharp edges. Advantageously, the spline interpolation method can also be used to optimize a parts program of a processing machine by obviating the need for large tables to describe the various positions.

Different types of splines exist, for example, Hermitian spines or cubic splines. Splines can be determined, for example, using Newton's method or the method of natural splines. Advantageously, boundary conditions can be set for splines, in particular cubic splines. Another condition may be that the kinetic change in a moving body is kept to a minimum, which defines at the transition point from one spline (n) to another spline (n+1) specific conditions for the velocity, e.g., $\dot{x}_n=\dot{x}_{n+1}$, or for the acceleration $\ddot{x}_n=\ddot{x}_{n+1}$. In addition to the aforementioned splines, which are also referred to as C-splines, A-splines ($\dot{x}_n=\dot{x}_{n+1}$ and $\ddot{x}_n\neq\ddot{x}_{n+1}$) or B-splines can be defined. B-splines have the same boundary conditions as C-splines, but a different geometrical course.

The number of support points can be selected according to known sampling theorems, taking into account the maximum rotation speed of a rotation axis.

An example for a $3_{rd}$ degree polynomial is:

$$x_e = a_0 + a_1*t + a_2*t^2 + a_3*t^3$$

The aforedescribed control method can describe the path of an eccentric contour and/or a freeform surface of a workpiece in simple terms. In addition, the motion of at least one moving body can be described and controlled based on the contour and/or surface.

Accordingly, different spline interpolations can be implemented with a processing machine, based on the tasks to be performed. The method can be used to describe the motion of at least one body, as well as the relative motion between two bodies. This can be the situation, for example, with a turning machine where both the workpiece to be machined and the tool machining the workpiece are moving.

The method of the invention advantageously improves the performance of a processing machine. For example, turning machines can be operated at a higher rotation speed. The method can advantageously be executed using standard components of numerical controllers and allows a more universal program definition. Freeform contours can be easily generated without requiring additional hardware components. In addition, application-specific programs using position tables can also be eliminated.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1A shows a longitudinal cross section of a body with a sinusoidal contour;

FIG. 1B shows a transverse cross section of the body of FIG. 1A, taken along Ue1 (KS1) and Ue3 (KS3), respectively;

FIG. 3 shows a conventional table used in turning applications;

FIG. 4 shows two coordinate system to be transformed into each other;

FIG. 5 shows an exemplary data flow for describing a path;

FIG. 7 shows a second table describing splines that describe a path according to the invention;

DETAILED DESCRIPTION OF PREFERRED EMBODIMENTS

Figure 2B:
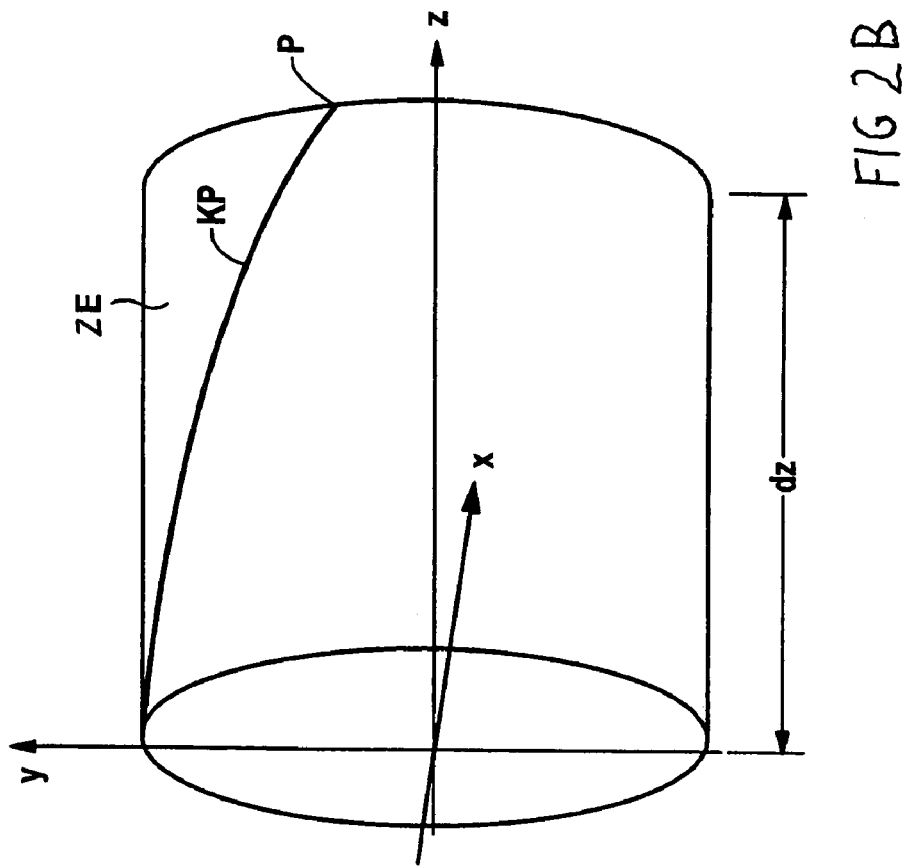
FIG. 2B shows a perspective view of the body of FIG. 1A between two locations of section S2, depicting torsion within the body.

Throughout all the Figures, same or corresponding elements are generally indicated by same reference numerals. These depicted embodiments are to be understood as illustrative of the invention and not as limiting in any way.

Turning now to the drawing, and in particular to FIGS. 1A and 1B, there is shown an example for turning sinusoidal contours. A body 1, for example, a workpiece, can be represented in a Cartesian coordinate system having x-, y-and z-axes. In FIG. 1A, the body 1 is illustrated in a longitudinal cross section in a z-y coordinate system, whereas FIG. 1B shows the body 1 in a transverse cross section taken along Ue1 (KS1) and Ue3 (KS3), respectively, in an x-y coordinate system. The body 1, i.e. the useful element, can be subdivided into several sectors S1, S2, S3, S4 and S5, wherein Ue1, Ue2, Ue3 and Ue4 indicate transition points between the sectors. This configuration of the body 1 is depicted in the diagram represented in the y-z coordinate system (FIG. 1A). The representation in the x-y coordinate system (FIG. 1B) clearly shows the sinusoidal contour of the body 1, showing an outer contour KS1 of the sector S1 and an outer contour KS3 of the sector S3. These two contours overlap in the x-y coordinate system if the outer contour KS1 of the sector S1 is identical to that of the sector S5. The exemplary sectors S1 and S5 are here assumed to have a circular cross section. Parameters which are referenced in the x-y coordinate system, for example, by the letters a, b, and r can be used to describe elliptical and/or oval geometries, wherein r denotes the distance r on the contour from the origin. An ovality in a plane is described by the following equations:

$$1 = \frac{x^2}{a^2} + \frac{y^2}{b^2} \quad (1)$$

$$X = a*\cos(u) \quad (2)$$

$$Y = b*\sin(u) \quad (3)$$

$$r = \sqrt{X^2 + Y^2} \quad (4)$$

$$\text{with } 0 \le u \le 2\pi. \quad (5)$$

Figure 2A:
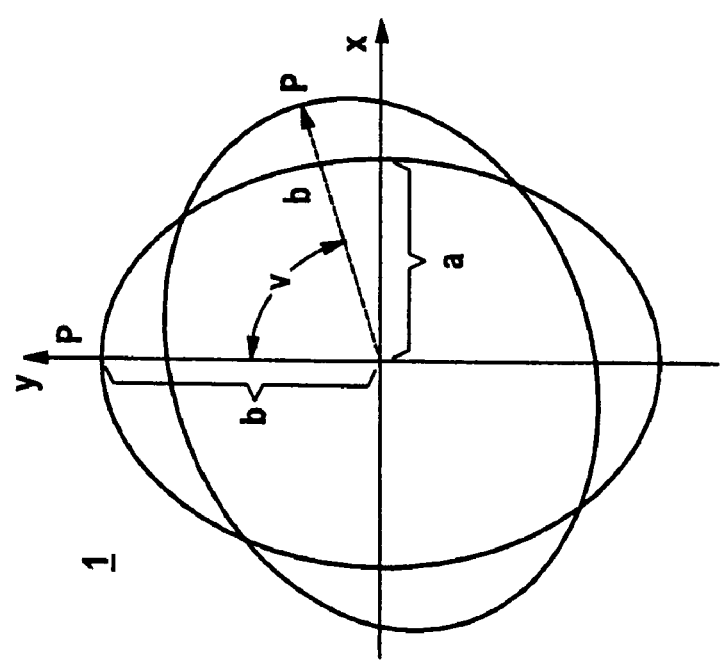
FIG. 2A shows a transverse cross section of the body of FIG. 1A, taken at two locations of section S2.

The transition Ue1 from sector S1 to sector S2 and continuing via transition Ue2 to sector S3 can be visualized as representing a torsion V, as shown more clearly in FIG. 2A.

FIG. 2A shows a cross-sectional view of sector S2 of the body 1 in the x-y coordinate system. As viewed along the z-axis, the point P moves away from the y-axis towards the x-axis as a result of the torsion V. The torsion V is shown in a cylindrical surface ZE in the x-y-z coordinate system of FIG. 2B. A reference letter dz denotes a distance delta on the z-axis. The displacement of the point P as a function of the position z in the x-y-z coordinate system is depicted by the curve KP (FIG. 2B). With the point P in the x-y-z coordinate system changing from a large value on the y-axis to a small value on the y-axis, a contour of sector S4 is produced, which is not to scale.

The body 1 illustrated in FIGS. 1 and 2 can be fabricated using a processing machine, such as a turning machine. The distance r of the eccentric contours, which are represented, for example, by the contour KS1 of sector S1 and by the contour KS2 of sector S2, can be controlled for turning by one or two independent variables. The distance r is hence a function f with r=f (z, c), wherein z represents a value on the z-axis and c represents an angular position. Separate discrete tables r=f(c) can be defined and stored in a controller for a number of n regions. The tables r=f(c) are switched at predefined positions on the z-axis from one table to the next. In turning machines, this position corresponds, for example, to the position of the cutting tool that removes material from a workpiece, i.e., the body 1. The available memory space limits the number of tables. This conventional method is unable to completely and/or continuously describe the contour to be machined, for example, as a freeform surface, since the tables have a two-dimension structure, can only be changed discretely and have a limited number of values. Unlike the method of the present invention, conventional tables may be unable to describe contours and freeform surfaces even in a limited fashion, since the tables are specific for a certain contour and/or a certain processing machine.

FIG. 3 shows a small subset of values from a table of the type described above, whereby the angular position is indicated following the parameter C and the position on the x-axis is indicated following the parameter X.

Mathematical operations are necessary for illustrating the displacements, such as the displacement depicted in FIG. 2B, and/or for converting contours and machining paths. FIG. 4 shows the x-y coordinate system with an x-axis and a y-axis and an x'-y' coordinate system with an x'-axis and a y'-axis. A point O in the x-y coordinate system is to be transformed into the x'-y' coordinate system. This transformation is achieved, for example, by the following formulas:

$$\begin{bmatrix} X' \\ Y' \\ Z' \end{bmatrix} = ROT(Z) * \begin{bmatrix} X \\ Y \\ Z \end{bmatrix} \quad (6)$$

$$X = \sqrt{X'^2 + Y'^2} \quad (7)$$

$$c = \arctan \frac{Y'}{X'} \quad (8)$$

$$Z = Z' \quad (9)$$

The axis parameters x, y, z refer, for example, to the axes of a processing machine, whereas the axis parameters x', y', z' represent a coordinate system for a superior representation.

The diagram of FIG. 5 shows an exemplary data flow DAT1, DAT2 that describes a path. Path descriptions are important for a processing machine, since such descriptions can describe contours and/or freeform surfaces of workpieces to be machined as well as the paths of, for example, tools. Tools include, for example, metal-cutting, grinding, planing, welding and other tools. Data describing such paths, which relate, for example, to the coordinate system(s) of the processing machine and represent original data ORIG, are supplied as a data flow DAT1 to a polynomial interpolator POLY. The polynomial interpolator converts the original data into polynomials which are preferably splines. Conversion in the polynomial interpolator POLY produces a data flow DAT2 which transmits the data to a parts program TP, where the data that describe the paths are available in form of a polynomial format. A subsequent step, where the polynomials are converted into set points on the axes, is not shown. This omitted step also includes the interpolation in the controller.

Figure 6:
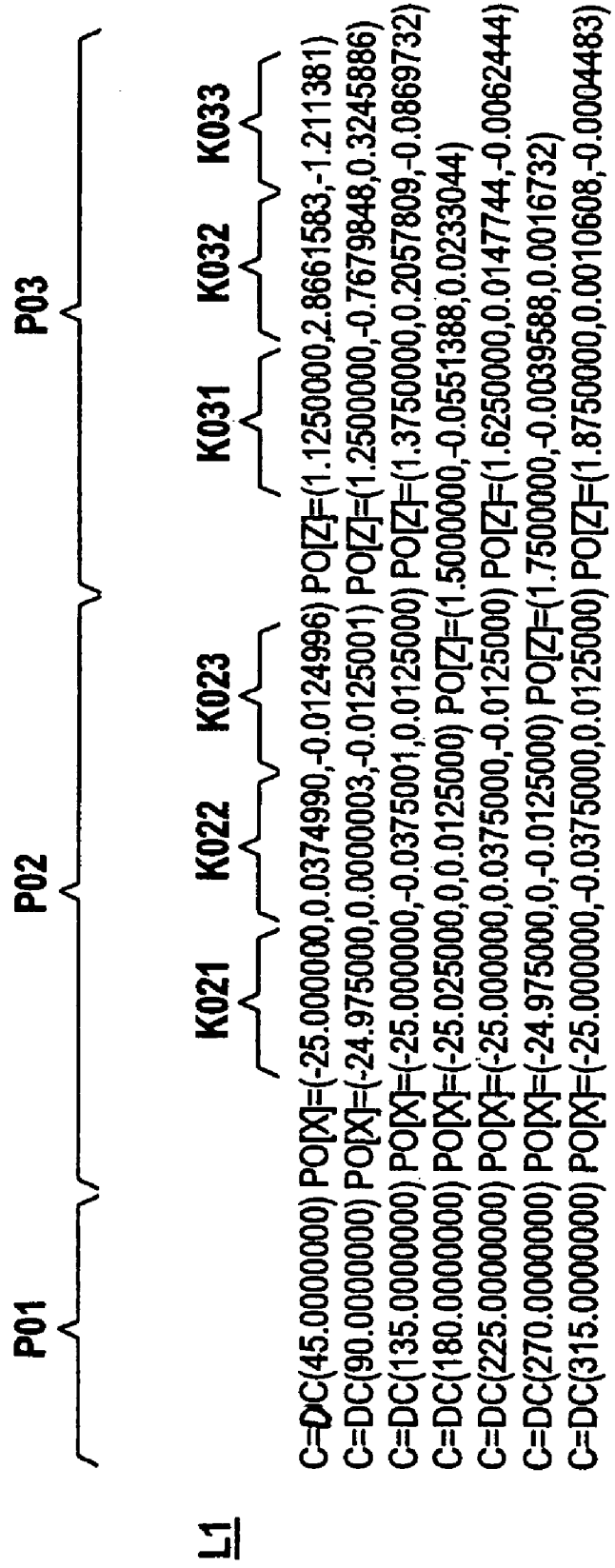
FIG. 6 shows a first table describing splines that describe a path according to the invention.

The diagram of FIG. 6 shows a list L1 or, depending on the representation, a table that describes splines. The interpolation parameter is herein the angular parameter c of a rotation axis C, i.e. of a turning axis. Each row in the list can be subdivided into different positions PO1, PO2 and PO3. The first position PO1 indicates the position of the turning axis C. The expression in parentheses is the angular position in degrees. DC stands for "Direct Coordinate".

The second position PO2 indicates the position on the x-axis, denoted by the letter X in square brackets. The second position can be calculated from a polynomial having three coefficients KO21, KO22 and KO23 shown in parentheses.

The third position PO3 indicates the position on the z-axis, denoted by the letter Z in square brackets. The third position can also be calculated using a polynomial with the three coefficients KO31, KO32 and KO33 shown in parentheses.

The polynomials are defined by their initial value, their final value and coefficients, such as $a_2$, $a_3$, which indirectly indicate the order of the polynomial. The values which define the polynomial can be changed. A polynomial is generally described by its coefficients, so that in the list L1 a final value $X_e$ of the polynomial on the x-axis is used to define the second position PO2. Accordingly, a coefficient, such as $a_1$, can be omitted for a $3^{rd}$ order polynomial. The value $X_e$ follows from $$X_e = a_0 + a_1 * u + a_2 * u^2 + a_3 * u^3$$

wherein u can be defined as a variable that depends on the rotation angle c.

In the presence of torsion, as indicated in FIG. 2, $X_e$ depends also on z. A zero position is required to define a location in space. In situations where it is advantageous to shift the origin, changes in the coefficients may have to be taken into account. $X_e$ may also be a function that depends on the origin.

The diagram of FIG. 7 shows a second list L2 or, depending on the representation, a table with splines and polynomials according to the invention. Unlike the list shown in FIG. 6, the change of the x-axis is linear in FIG. 7.

The first row Z1 of the list L2 the start position.

The second row Z2 of the list L2 defines the absolute reference system.

The third row z3 of the list L2 indicates the beginning of the polynomial description.

Both the list of FIG. 6 and the list of FIG. 7 can be viewed as a parts program of a processing machine. The angular positions have a mutual separation of 45°. The spacings can be determined according to the sampling rules.

Figure 8:
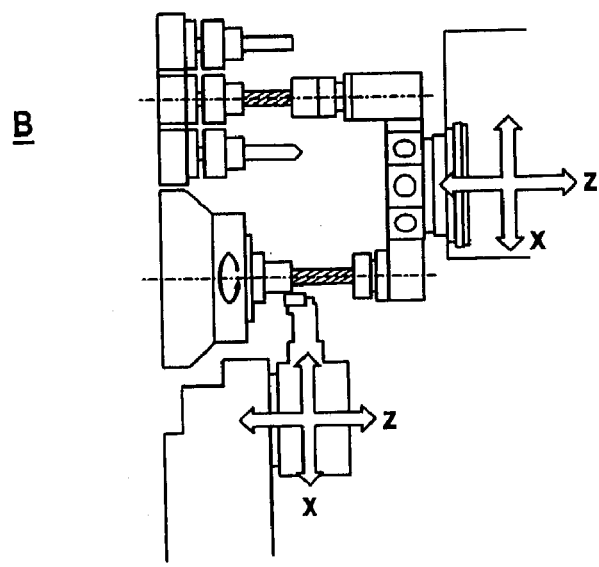
FIG. 8 shows a diagram indicating axes of a processing machine.

The diagram of FIG. 8 shows schematically the axes z, x and c of a processing machine B, for example, a single-spindle bar turning machine.

Figure 9:
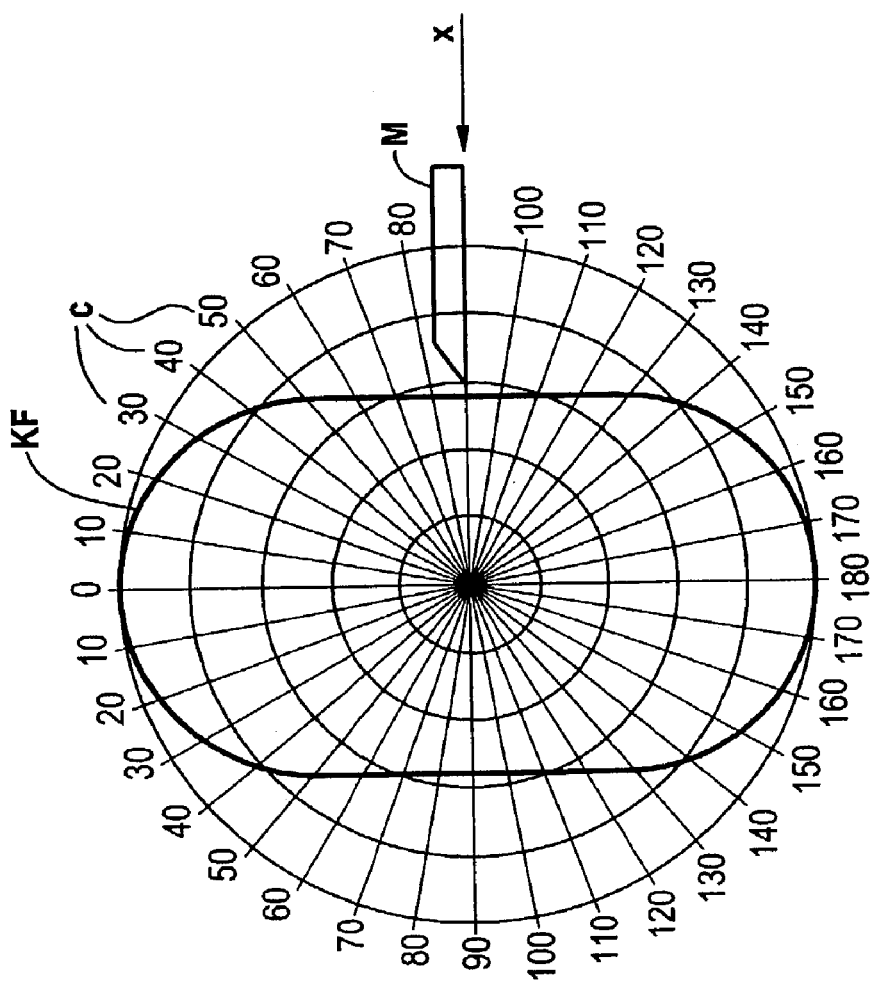
FIG. 9 shows a comparison between a free contour and a value table.

FIG. 9 compares a value table WT listing angular parameters c with the form of a free contour KF. A minimum value Min, nominal value Nom and a maximum value Max is associated with each angle c on an x-axis x. FIG. 9 illustrates this situation by depicting a cutting tool, such as a lathe cutter M, wherein the lathe cutter M is displaced radially along the x-axis x. The angle "0", i.e., the origin of the angular parameter c for this axis, is located in the upper half of the Figure. The origin can be shifted for different segments, or splines. According to the invention, different origins can be easily established for the angles to describe a freeform surface.

Figure 10:
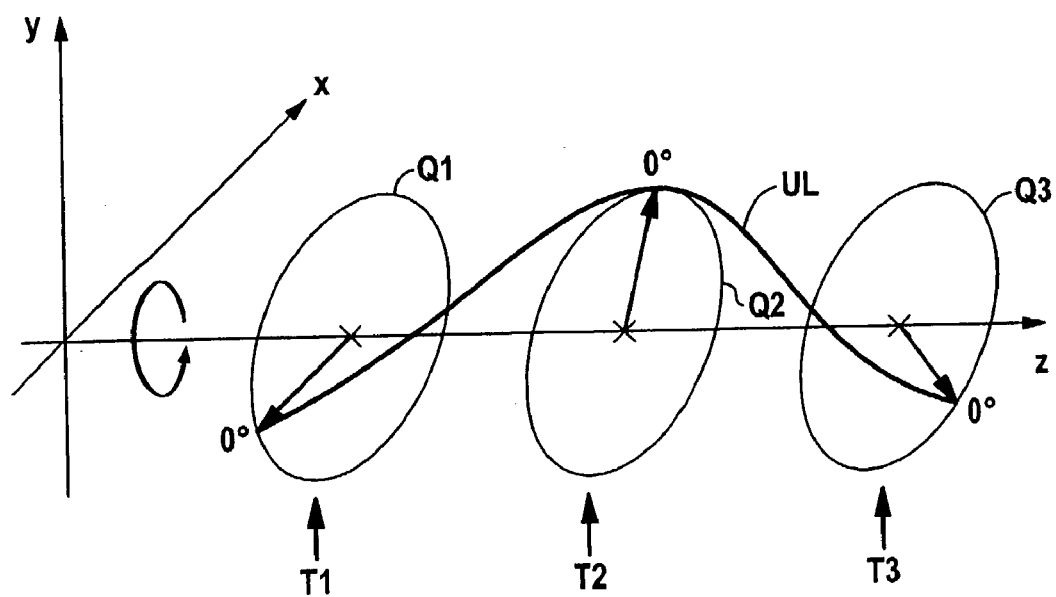
FIG. 10 shows a displacement of the coordinate origin for taking into account angles.

FIG. 10 shows an exemplary displacement of the origin for depicting the angles. Three perspective cross sections Q1, Q2 and Q3 of a body are shown. A corresponding table T1, T2 and T3 is associated with each crosssection. The tables T1, T2 and T3 are not explicitly shown in FIG. 10. Each table contains the splines necessary to describe the course of the cross-sections. Each table refers to a different zero-degree position 0°. The sequence of zero-degree positions produces a line UL of origins which defines the origins of the c-axis C for the positions on the x-axis. This allows an interpolation of the zero-degree positions or zero positions. Previously, only discrete switchovers were possible which can disadvantageously require larger data sets or be less accurate. Linear interpolations used until now also required large data sets if the sectors S1, S2, S3, S4 or S5 depicted, for example, in FIG. 1 had different origins. The invention advantageously uses the parameters C of the c-axis as interpolation parameters. The zero position, or origin, can shift either continuously or segment-by-segment with Z, or may also remain constant.

If a tool is movably guided on the x-axis x, as shown in FIG. 9, then it can be clearly seen from FIG. 10 that the position X, for example, of a lathe cutter, can be a function of two parameters c and z. The letter z represents here an advance of the tool in the z-direction, wherein the advance in the z-direction is a relative displacement, like in all other directions. The workpiece, the tool and the combination thereof can move relative to each other. A spiral advance can be represented by two superpositioned curves, defined by the functions $f_1(c)$ and $f_2(z)$, resulting in the equation $x=\Sigma(f_2(c)+f_2(z))$ While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for controlling an industrial processing machine, comprising the steps of:
    defining a contour of a workpiece to be machined in a coordinate system;
    defining at least one continuous three-dimensional machining path in a cylindrical coordinate system, the cylindrical coordinates being a rotation angle of a tool relative to the workpiece, a feed distance of a tool relative to the workpiece, and a distance of the tool from the origin of the coordinate system;
    performing at least one interpolation along the continuous three-dimensional machining path; and
    guiding a movement of the workpiece or tool, or both, along the interpolated continuous three-dimensional machining path,
    wherein the at least one interpolation along the continuous three-dimensional machining path is a function of the rotation angle.

2. The method of claim 1, wherein the interpolation is performed by using at least one polynomial function.

3. The method of claim 1, wherein the interpolation is performed by using at least one spline function.

4. The method of claim 1, wherein the three-dimensional machining path defines an eccentric contour of a workpiece.

5. The method of claim 1, wherein the three-dimensional machining path defines a freeform surface of a workpiece.

6. The method of claim 1, wherein the three-dimensional machining path defines a guided movement of at least one moving body.

7. The method of claim 1, wherein the movement is guided so that the workpiece and the tool move relative to each other.

8. The method of claim 1, wherein the processing machine is a turning machine.

9. The method of claim 1, wherein the three-dimensional machining path comprises a plurality of path segments and the interpolation is performed at connecting points between adjacent path segments.

10. The method of claim 9, wherein at the connecting points, at least one of a slope or a curvature of the adjacent path segments is continuous.

11. The method of claim 1, wherein the processing machine is selected from the group consisting of robot, lathe, milling machine, grinder, sander, planer, and painting machine.

12. The method of claim 1, wherein the coordinate system is a Cartesian coordinate system.

13. A processing machine with a tool for machining a workpiece, said processing machine comprising a controller that defines, based on a defined contour of a workpiece to be machined in a coordinate system, at least one continuous three-dimensional machining path in a cylindrical coordinate system, wherein the coordinates of the cylindrical coordinate system are a rotation angle of the tool relative to the workpiece, a feed distance of the tool relative to the workpiece, and a distance of the tool from the origin of the coordinate system; performs at least one interpolation along the continuous three-dimensional machining path; and guides a movement of the workpiece or tool, or both, along the interpolated continuous three-dimensional machining path, wherein the at least one interpolation along the continuous three-dimensional machining path is a function of the rotation angle.

14. The processing machine of claim 13, wherein the processing machine is selected from the group consisting of robot, turning machine, lathe, milling machine, grinder, sander, planer and painting machine.

15. The processing machine of claim 13, wherein.the coordinate system is a Cartesian coordinate system.

* * * * *